United States Patent [19]

Slana

[11] Patent Number: 4,485,468

[45] Date of Patent: Nov. 27, 1984

[54] CONTROL WORD GENERATION METHOD AND SOURCE FACILITIES FOR MULTIRATE DATA TIME DIVISION SWITCHING

[75] Inventor: Matthew F. Slana, Naperville, Ill.

[73] Assignee: AT&T Bell Laboratories, Murray Hill, N.J.

[21] Appl. No.: 364,258

[22] Filed: Apr. 1, 1982

[51] Int. Cl.³ .............................................. H04J 3/06
[52] U.S. Cl. .......................................... 370/58; 370/84
[58] Field of Search .................. 370/58, 53, 63, 84, 370/54, 66; 179/18 FS

[56] References Cited

U.S. PATENT DOCUMENTS

| Re. 29,215 | 5/1977 | Carney et al. | 179/15 |
|---|---|---|---|
| 3,804,987 | 4/1974 | Cooper | 370/84 |
| 4,005,272 | 1/1977 | Collins et al. | 370/54 |
| 4,068,098 | 1/1978 | Thyselius | 370/66 |
| 4,122,309 | 10/1978 | Jacobsen | 179/15 |
| 4,122,310 | 10/1978 | Rydén et al. | 370/58 |
| 4,206,322 | 6/1980 | Lurtz | 370/63 |
| 4,332,026 | 5/1982 | Alvarez et al. | 370/66 |

FOREIGN PATENT DOCUMENTS

| 45043 | 7/1980 | European Pat. Off. | 370/53 |
|---|---|---|---|
| 2447660 | 1/1979 | France | 370/53 |
| 110492 | 2/1979 | Japan | 370/66 |
| 62693 | 10/1980 | Japan | 370/53 |
| 97294 | 12/1983 | Japan | 370/53 |
| 99095 | 12/1983 | Japan | 370/53 |

OTHER PUBLICATIONS

L. Reaume, "The DX Chip", Canadian Electronics Engineering, Oct. 1981, vol. 25, No. 10, pp. 32-34.

Primary Examiner—Douglas W. Olms
Assistant Examiner—Wellington Chin
Attorney, Agent, or Firm—F. W. Padden; R. T. Watland

[57] ABSTRACT

A control word generation method and a structural arrangement of a control word source for use in a time division switching system for serving multirate data stations. The control word source includes a first memory that stores a first plurality of path-definition words defining communication paths for nonsubrate channels and a plurality of storage reference words. The control word source also includes a second memory that stores a second plurality of path-definition words defining communication paths for subrate channels. The first memory is read sequentially and control words are derived from each of the read path-definition words. A location generator responds to timing pulses generated by a network clock and to each of the plurality of read storage reference words by generating a location signal defining a storage location of the second memory. The second memory is read in response to this location signal and a control word is derived from the path-definition word thus read.

17 Claims, 8 Drawing Figures

FIG. 6

TYPICAL PATTERN IN TIME SLOT MEMORY 51

| WORD \ BIT | 1 | 2 | 3 | 4 | 5 | 6 | 7 | 8 | 9 | 10 | 11 | 12 | 13 | |
|---|---|---|---|---|---|---|---|---|---|---|---|---|---|---|
| | | A | | | B | | C | D | | E | | | | |
| 1 | 0 | 1 | 0 | 1 | 0 | 0 | 1 | 1 | 0 | 0 | 0 | 0 | 0 | ACTIVE 56k BIT CHANNEL - SELECT 5 |
| 2 | 0 | 1 | 1 | 1 | 0 | 0 | 0 | 1 | 0 | 0 | 0 | 0 | 0 | IDLE |
| 3 | 1 | 0 | 1 | 0 | 0 | 0 | 1 | 1 | 0 | 0 | 0 | 0 | 0 | IDLE |
| --- | | | | | | | | | | | | | | |
| 8 | 1 | 0 | 0 | 1 | 0 | 0 | 1 | 0 | 0 | 0 | 0 | 0 | 0 | ACTIVE 56k BIT CHANNEL - SELECT 13 |
| 9 | X | X | X | X | 0 | 1 | 1 | 0 | 0 | 0 | 0 | 0 | 1 | 9.6k BIT CHANNEL - ASM LOCATION 1 |
| --- | | | | | | | | | | | | | | |
| 12 | X | X | X | X | 1 | 0 | 1 | 0 | 0 | 0 | 1 | 1 | 0 | 4.8k BIT CHANNEL - ASM LOCATION 6 |
| --- | | | | | | | | | | | | | | |
| 17 | X | X | X | X | 1 | 1 | 1 | 1 | 1 | 1 | 0 | 0 | 1 | 2.4k BIT CHANNEL - ASM LOCATION 21 |
| --- | | | | | | | | | | | | | | |
| 26 | X | X | X | X | 0 | 0 | 1 | 0 | 1 | 1 | 0 | 0 | 0 | 9.6k BIT CHANNEL - ASM LOCATION 16 |
| 27 | 1 | 0 | 0 | 1 | 0 | 0 | 0 | 1 | 0 | 0 | 0 | 0 | 0 | IDLE |
| --- | | | | | | | | | | | | | | |
| 128 | 0 | 1 | 1 | 0 | 0 | 0 | 1 | 1 | 0 | 0 | 0 | 0 | 0 | ACTIVE 56k BIT CHANNEL - SELECT 6 |

X = DON'T CARE

FIG. 7
TYPICAL PATTERN IN ASSOCIATIVE SUBRATE MEMORY 52

| WORD \ BIT | 1 | 2 | 3 | 4 | 5 | 6 | |
|---|---|---|---|---|---|---|---|
| | | a | | | b | c | |
| | 1 | 2 | 3 | 4 | 5 | 6 | |
| 1 | 1 | 0 | 0 | 1 | 0 | 1 | ACTIVE 9.6k BIT CHANNEL – SELECT 9 |
| 2 | 1 | 1 | 0 | 0 | 0 | 1 | ACTIVE 9.6k BIT CHANNEL – SELECT 12 |
| 3 | 0 | 1 | 1 | 0 | 1 | 0 | IDLE |
| 4 | 0 | 0 | 0 | 0 | 0 | 1 | ACTIVE 9.6k BIT CHANNEL – SELECT 4 |
| 5 | 1 | 1 | 1 | 1 | 0 | 1 | ACTIVE 9.6k BIT CHANNEL – SELECT 15 |
| 6 | 1 | 0 | 0 | 1 | 0 | 1 | ACTIVE 4.8k BIT CHANNEL – SELECT 10 |
| 7 | 1 | 1 | 1 | 0 | 0 | 0 | IDLE |
| --- | | | | | | | |
| 15 | 0 | 0 | 0 | 1 | 1 | 1 | ACTIVE 4.8k BIT CHANNEL – SELECT 1 |
| 16 | 1 | 1 | 0 | 0 | 1 | 0 | IDLE |
| 17 | 0 | 0 | 1 | 1 | 1 | 1 | ACTIVE 9.6k BIT CHANNEL – SELECT 7 |
| 18 | 0 | 1 | 0 | 0 | 0 | 0 | IDLE |
| 19 | 0 | 1 | 1 | 1 | 0 | 1 | ACTIVE 9.6k BIT CHANNEL – SELECT 6 |
| 20 | 0 | 0 | 0 | 0 | 1 | 0 | IDLE |
| 21 | 0 | 0 | 0 | 0 | 0 | 1 | ACTIVE 2.4k BIT CHANNEL – SELECT 0 |
| 22 | 0 | 1 | 0 | 1 | 0 | 0 | IDLE |
| --- | | | | | | | |
| 40 | 0 | 0 | 1 | 0 | 1 | 1 | ACTIVE 2.4k BIT CHANNEL – SELECT 2 |

FIG. 8

OPERATION OF CONTROL WORD SOURCE 50

| FRAME NUMBER | TIME SLOT (CHANNEL) | SUBRATE | FRAME SIGNAL XMITTED BY SEL CCT 65 | DATA FIELD E FROM TSM 51 | ASM 52 LOCATION READ |
|---|---|---|---|---|---|
| 1 | 9 | 9.6kBIT | 1 | 1 | 1 |
|   | 12 | 4.8 | 1 | 6 | 6 |
|   | 17 | 2.4 | 1 | 21 | 21 |
|   | 26 | 9.6 | 1 | 16 | 16 |
| 2 | 9 | 9.6 | 2 | 1 | 2 |
|   | 12 | 4.8 | 2 | 6 | 7 |
|   | 17 | 2.4 | 2 | 21 | 22 |
|   | 26 | 9.6 | 2 | 16 | 17 |
| 3 | 9 | 9.6 | 3 | 1 | 3 |
|   | 12 | 4.8 | 3 | 6 | 8 |
|   | 17 | 2.4 | 3 | 21 | 23 |
|   | 26 | 9.6 | 3 | 16 | 18 |
| 4 | 9 | 9.6 | 4 | 1 | 4 |
|   | 12 | 4.8 | 4 | 6 | 9 |
|   | 17 | 2.4 | 4 | 21 | 24 |
|   | 26 | 9.6 | 4 | 16 | 19 |
| 5 | 9 | 9.6 | 5 | 1 | 5 |
|   | 12 | 4.8 | 5 | 6 | 10 |
|   | 17 | 2.4 | 5 | 21 | 25 |
|   | 26 | 9.6 | 5 | 16 | 20 |
| 6 | 9 | 9.6 | 1 | 1 | 1 |
|   | 12 | 4.8 | 6 | 6 | 11 |
|   | 17 | 2.4 | 6 | 21 | 26 |
|   | 26 | 9.6 | 1 | 16 | 16 |
| 7 | 9 | 9.6 | 2 | 1 | 2 |
|   | 12 | 4.8 | 7 | 6 | 12 |
|   | 17 | 2.4 | 7 | 21 | 27 |
|   | 26 | 9.6 | 2 | 16 | 17 |
| 8 | 9 | 9.6 | 3 | 1 | 3 |
|   | 12 | 4.8 | 8 | 6 | 13 |
|   | 17 | 2.4 | 8 | 21 | 28 |
|   | 26 | 9.6 | 3 | 16 | 18 |
| 9 | 9 | 9.6 | 4 | 1 | 4 |
|   | 12 | 4.8 | 9 | 6 | 14 |
|   | 17 | 2.4 | 9 | 21 | 29 |
|   | 26 | 9.6 | 4 | 16 | 19 |
| 10 | 9 | 9.6 | 5 | 1 | 5 |
|   | 12 | 4.8 | 10 | 6 | 15 |
|   | 17 | 2.4 | 10 | 21 | 30 |
|   | 26 | 9.6 | 5 | 16 | 20 |
| 11 | 9 | 9.6 | 1 | 1 | 1 |
|   | 12 | 4.8 | 1 | 6 | 6 |
|   | 17 | 2.4 | 11 | 21 | 31 |
|   | 26 | 9.6 | 1 | 16 | 16 |

CONTROL WORD GENERATION METHOD AND SOURCE FACILITIES FOR MULTIRATE DATA TIME DIVISION SWITCHING

TECHNICAL FIELD

This invention relates to control word source facilities for use in time division switching systems for controlling the establishment of communication paths for multirate data stations and, more particularly, to memory and control arrangements which reduce the magnitude of the control word storage facilities required in those systems.

BACKGROUND OF THE INVENTION

One approach to the problem of providing digital data communication service to an increasing number of customer stations in a time division switching system relies on the low data rates required by many of those stations. The approach, referred to as subrate switching, has groups of like data rate stations share channels of the switching system. For example, in a system having 128 channels per 125-microsecond frame, a group of twenty stations having a data rate of one data word per twenty frames can share one channel of the system.

Time division switching systems generally function in repetitive time slots of fixed duration. During each time slot a data word from an originating station is switched to the destination station defined by a control word associated with that time slot. The control words which control the switching system are typically stored by the switching system as at least one list which is accessed in a predetermined sequence at the rate of one control word per time slot. In a 128-channel system without subrate switching, the control word sequence required is a 128-word sequence. However, if a group of twenty subrate stations each having a different associated control word is allowed to share one channel of the system, a 2,560-word control word sequence is required for control. Known subrate systems have achieved such long control word sequences by manifold increases in their control word storage capacities.

An additional complication is present in subrate switching systems wherein a first plurality of stations have a data rate of one data word per n channels and a second plurality of stations have a data rate of one data word per m channels where m is less than n and n is not an integer multiple of m. U.S. Pat. No. 4,206,322 issued to J. W. Lurtz on June 3, 1980, discloses a time division switching system directed to this complication. The Lurtz system includes a first storage arrangement having n storage locations and a second storage arrangement having m storage locations. However, in a typical case where many of the Lurtz system channels are not used for subrate data, the required control word storage capacity is still unnecessarily large since, for example, each control word associated with a nonsubrate channel is stored in multiple locations. Further, extension of the system to serve a third plurality of stations having a data rate of one data word per p channels would, for certain values of p, require a third storage arrangement having p storage locations.

U.S. Pat. No. 4,122,309 issued to C. C. Jacobsen on Oct. 24, 1978, teaches a method and apparatus for generating a sequence of signals using first and second read-only memories. The first memory provides for generation of unique portions of the sequence and the second memory provides for generation of a single subsequence which is repeated several times within the sequence. However, typical control word sequences for subrate switching systems are not of the type having a single repeated subsequence.

In view of the foregoing, a recognized problem in the art is that an undesirably large magnitude of complex and costly control word storage facilities are required in time division switching systems for serving multirate data customer stations.

SUMMARY OF THE INVENTION

The aforementioned problem is advantageously solved and a technical advance is achieved in accordance with the principles of the invention in both a control word generation method and a plural memory and control arrangement which reduce the magnitude of control word storage facilities needed to generate the long control word sequences used to control the establishment of nonsubrate and subrate data communication paths through a time division switching system. Advantageously, each customer-associated control word is stored in only one storage location in contrast to prior art designs which typically require such a word to be stored repetitively in many locations. The reduction in the required control word storage facilities is achieved by using a first memory identified with a single time division frame and, advantageously, a second memory and a control arrangement which is operated under control of information read from the first memory to define communication paths for subrate stations. The first memory stores storage reference words defining locations of the second memory for each subrate channel of the frame in addition to path-definition words defining communication paths for nonsubrate channels. Because the second memory stores all the path-definition words for subrate channels and the first memory is used to reference locations of the second memory to generate the proper control word sequences, stations having a wide variety of data rates can be accommodated without unduly duplicating the required memory and control arrangements.

A control word generation method in accordance with the present invention is used to control the establishment of communication paths in a time division switching system. The method includes sequentially reading a first plurality of path-definition words and a plurality of storage reference words from a first memory and deriving a control word from each of the path-definition words thus read. For each of the storage reference words read, one of a second plurality of path-definition words is read from a second memory. A control word is then derived from the path-definition word read from the second memory.

A control word source in accordance with the present invention supplies control words defining nonsubrate and subrate data communication paths through a time division switching system. The control word source includes both a subrate memory and a nonsubrate and reference memory. The subrate memory stores subrate data path-definition words and the nonsubrate and reference memory stores both nonsubrate data path-definition words and storage reference words. The control word source further includes a circuit which responds to storage reference words read from the nonsubrate and reference memory by defining locations of the subrate memory to effect a reading of subrate data path-definition words. A logic circuit responds to nonsubrate data path-definition words read from the nonsubrate and reference memory by supplying control words defining nonsubrate data communication paths through the switching system. The logic circuit also responds to subrate data path-definition words read from the subrate memory by supplying control words defining subrate data communication paths.

An illustrative embodiment of a control word source in accordance with present invention includes a clock which generates timing pulses and a location generator which responds to these timing pulses and the storage reference words read from the nonsubrate and reference memory by generating location signals defining locations in the subrate memory. In a specific embodiment, the location generator includes a frequency divider, a modulo-20 counter, a modulo-10 counter, a modulo-5 counter, a selector circuit and an adder/subtracter. The frequency divider receives the clock timing pulses and generates frame pulses at a rate of one frame pulse per fixed number of timing pulses. Each of the aforementioned counters counts these frame pulses to generate a unique repeating sequence of frame signals. The selector circuit responds to a given one of the storage reference words read from the nonsubrate and reference memory by selecting one of the aforementioned counters and the adder/subtracter arithmetically combines the frame signal generated by the selected counter with a portion of the given storage reference word to generate one of the location signals. This location signal defines the location to be read in the subrate memory.

DRAWING DESCRIPTION

FIGS. 6 and 7 illustrate typical word storage patterns in the time-slot memory and associative subrate memory of FIG. 1.

DETAILED DESCRIPTION

Figure 1:
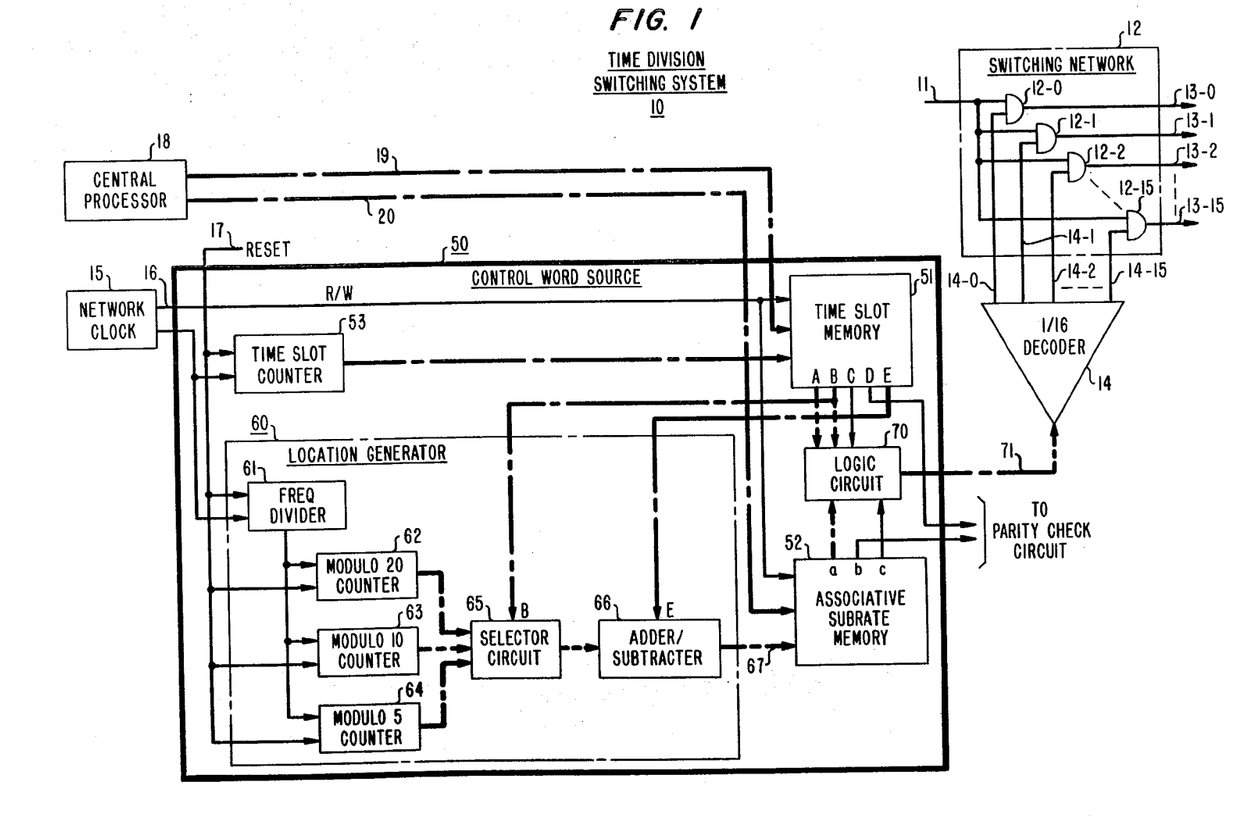
FIG. 1 is a block diagram of a time division switching system illustrating in heavy line block the control word source in accordance with the present invention.

FIG. 1 is a block diagram of a time division switching system 10 embodying the present invention. Switching system 10 includes an incoming time-multiplexed line 11, sixteen outgoing time-multiplexed lines 13-0 through 13-15 and a switching network 12 for establishing connections therebetween. Switching system 10 is merely illustrative and the principles of the present invention also apply to switching systems having several stages of interconnected networks such as the system disclosed in G. D. Johnson et al., U.S. Pat. No. 3,736,381, of May 29, 1973. Incoming line 11 conveys multiplexed digital data from a plurality of customer stations (not shown) in 125-microsecond frames of 128 time-separated channels. Accordingly, the time period of a single time-separated channel is approximately 976 nanoseconds. Data words transmitted in any given channel comprise seven information bits and one control bit. The maximum information capacity of one channel per frame accordingly is 56 kilobits per second (7 bits/125 microseconds). The present embodiment also accommodates in certain channels on incoming line 11 customer stations having lower data rates such as 2.4 kilobits per second, 4.8 kilobits per second, and 9.6 kilobits per second. Customer stations having data rates less than 56 kilobits per second are referred to herein as subrate stations while stations having a data rate of 56 kilobits per second are referred to as nonsubrate stations. To achieve system efficiency, certain subrate stations share one of the 56 kilobits per second data channels. It should be noted that when stations share a channel, one of the seven information bits is required for customer identification leaving six bits for data. This results in a maximum capacity for one channel per frame of 48 kilobits per second for subrate communication. The following table shows the number of stations of particular data rates which can share a channel:

| Data Rate (Kilobits per Second) | Maximum Number of Sharing Stations (M) |
|---|---|
| 2.4 | 20 |
| 4.8 | 10 |
| 9.6 | 5 |

Figure 2:
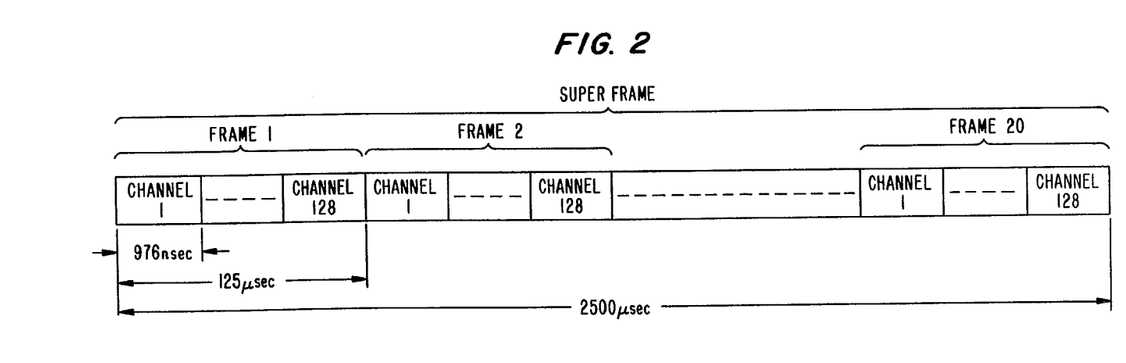
FIGS. 2 and 5 are illustrative timing diagrams for the system of FIG. 1.

Subrate stations share a channel by using it once every M frames where M equals the maximum number of stations sharing the channel. Accordingly, the number of channels between successive usages by the same subrate station in the present embodiment is 128 times the maximum number of stations sharing the channel. For example, a 2.4 kilobits per second station will make use of its associated channel every twentieth frame or every 2,560 channels. The process of channel sharing in the present embodiment can be conceptualized by reference to a "super frame" which comprises 2,560 time-separated channels every 2,500 microseconds (FIG. 2). Within a super frame each station has at least one associated channel. For example, if channel 9 is used by a given 9.6 kilobits per second station, data words from that station will be in channel 9 every fifth frame. Accordingly, the given station will use channel 9 four times per super frame. A 2.4 kilobits per second station, however, will use its associated channel only once per super frame. An arrangement for multiplexing data words onto a time-multiplexed line of the present type is disclosed in A. C. Carney et al., U.S. Pat. No. Re. 29,215, of May 10, 1977.

Switching network 12, which in the present example comprises sixteen AND gates 12-0 through 12-15, operates under the control of a control word source 50 via a 1-out-of-16 decoder 14. Control word source 50 receives timing pulses from a precision network clock 15, which is also used to time incoming line 11 in a manner not illustrated in the drawing, and in response to these timing pulses source 50 generates one four-bit control word during each 976-nanosecond time slot on line 11. Source 50 transmits the four-bit control words to decoder 14 via a four-conductor path 71. Decoder 14 decodes the four-bit control words and generates a logic one enable signal on the appropriate one of sixteen conductors 14-0 through 14-15 to enable the corresponding one of the AND gates 12-0 through 12-15. In this manner, each of the four-bit control words generated by control word source 50 defines a connection between incoming line 11 and one of the sixteen outgoing lines 13-0 through 13-15 during each time slot.

If switching system 10 was not designed to accommodate subrate stations, source 50 could generate repetitive 128-word sequences corresponding to the 128 channels of each frame. However, since in the present example each 2.4 kilobits per second subrate station sharing a given channel may require a different path through switching network 12 and each of those stations is associated with only one 976-nanosecond time slot per 2500-microsecond super frame, source 50 must generate repetitive 2560-word sequences corresponding to the 2560 time slots in each super frame.

Figure 3:
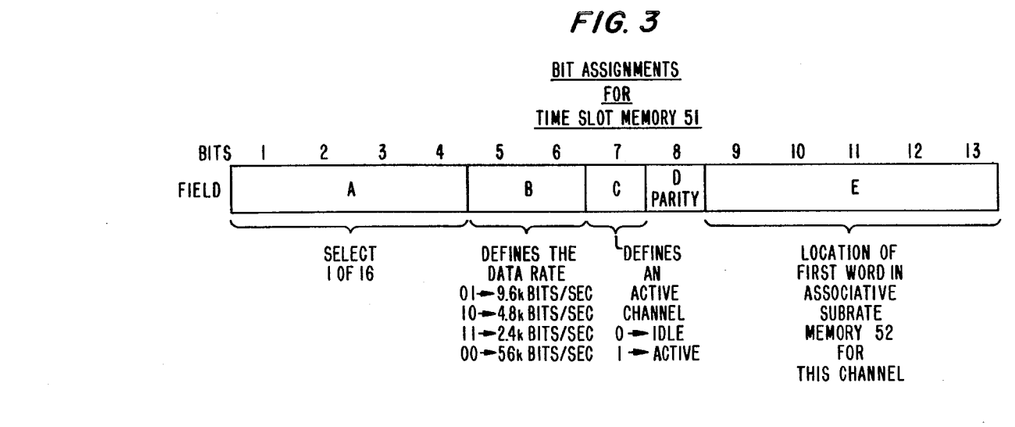
FIGS. 3 and 4 define bit assignments for the time-slot memory and associative subrate memory of FIG. 1.

Source 50 includes a 128-word time-slot memory 51, also referred to herein as a nonsubrate and reference memory. The words stored in memory 51 correspond to the 128 channels on line 11 and each such word comprises thirteen bits grouped as five data fields, A, B, C, D and E (FIG. 3). Data field B comprises two bits defining the data rate for the corresponding channel on line 11. If B=00, the corresponding channel is used for one 56 kilobits per second station and data field A, which comprises four bits, defines the path to be established through network 12 for that station. However, if B≠00, the corresponding channel can be shared by like data rate subrate stations, the bits in data field A are not used, and the paths to be established in switching network 12 for those stations are determined from words stored in an associative subrate memory 52 at locations defined in part by five bits comprising data field E. For the present example, three subrates are possible—9.6 kilobits per second (B=01), 4.8 kilobits per second (B=10) and 2.4 kilobits per second (B=11). Data field C comprises a single bit defining whether the corresponding channel is idle or active and data field D comprises a parity bit.

Words comprising data fields A through E stored in memory 51 having B=00 are referred to herein as nonsubrate data path-defining words since they include bits defining communication paths through switching network 12 for nonsubrate data channels. Words comprising data fields A through E stored in memory 51 having B≠00 are referred to as storage reference words since they include bits defining storage locations in memory 52.

Figure 4:
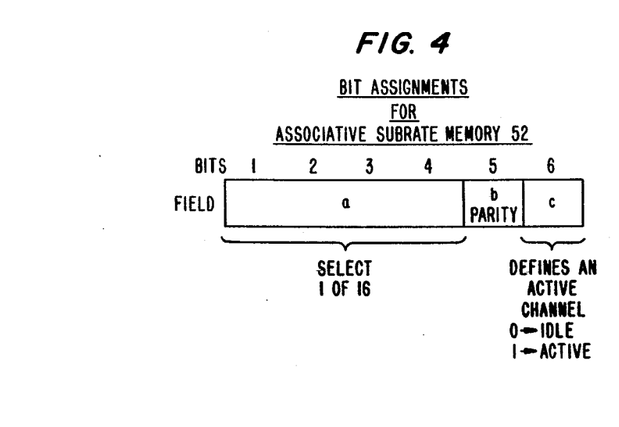

The words stored in memory 52 comprise six bits grouped as three data fields, a, b and c (FIG. 4). The words corresponding to a given subrate channel are stored in consecutive locations of memory 52 and the location of the first one of those words is defined by data field E of the word stored in memory 51 that corresponds to the given channel. Four bits comprising data field a define the path to be established in switching network 12 for each subrate station. Data field b comprises a parity bit and data field c comprises a single bit defining whether the corresponding channel is idle or active. The words stored in associative subrate memory 52 are referred to herein as subrate data path-definition words.

Memories 51 and 52 are periodically read to provide control words to control network 12 and are less frequently written to establish new communication paths or to abolish unneeded ones. To accommodate both reading and writing of memories 51 and 52, each time slot is divided into a read half and a write half. Network clock 15 generates a square wave output signal on a conductor 16. When the output signal on conductor 16 is a logic one a memory read occurs. When the output signal on conductor 16 is a logic zero a memory write can be done by a central processor 18 to change the communication path through network 12 in response to a call from a given station. Central processor 18 transmits the appropriate information including the location to be written to memory 51 via a multi-conductor path 19 or to memory 52 via a multi-conductor path 20.

Figure 5:
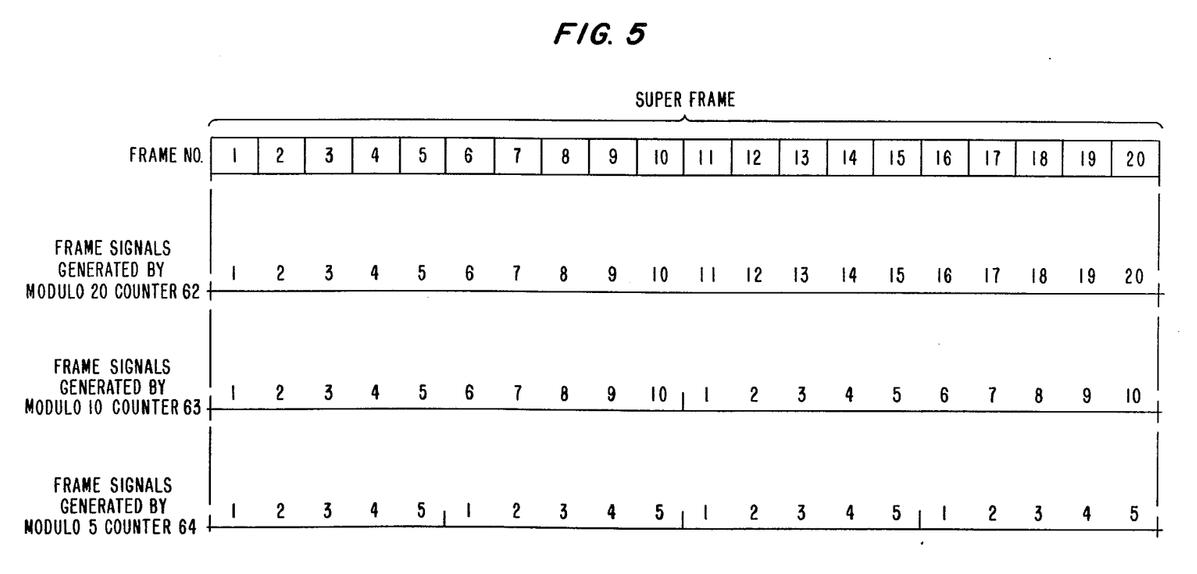

Memory 51 is read once per time slot at consecutive memory locations from 1 through 128 defined by the time-slot signals generated by a time-slot counter 53, which is driven by network clock 15. Memory 52 is read only for subrate channels and at locations determined by a location generator 60 in response to signals from data fields B and E of the storage reference words of memory 51 associated with those subrate channels. Location generator 60 includes a frequency divider 61 which divides the timing pulses of network clock 15 to generate frame pulses at a rate of one frame pulse per 125-microsecond frame. These frame pulses are counted by a modulo-20 counter 62, a modulo-10 counter 63 and a modulo-5 counter 64. In turn, counters 62, 63 and 64 generate recurring sequences of frame signals as shown in FIG. 5. Counter 62 is associated with the 2.4 kilobits per second data rate, counter 63 with the 4.8 kilobits per second data rate and counter 64 with the 9.6 kilobits per second data rate. A selector circuit 65 receives the frame signals from counters 62, 63 and 64 and the two bits comprising data field B of each word read from time-slot memory 51. Circuit 65 selects the frame signal from the one of the counters 62, 63 and 64 associated with the data rate defined by data field B. Circuit 65 then transmits the selected frame signal to an adder/subtracter 66 which forms the binary sum of the selected frame signal and the five bits comprising data field E from memory 51. Circuit 66 further subtracts one from that binary sum and transmits a location signal representing the resulting binary number over a multi-conductor path 67 to define a location to be read in memory 52.

Information bits of both the data fields A, B and C in the read location of memory 51 and data fields a and c in the read location of memory 52 are transmitted to a logic circuit 70 for effecting a selection for each active channel of either data field A from memory 51 or data field a from memory 52 for transmission on four-conductor path 71. The selection is accomplished under control of data fields B, C, and c. When B=00 and C=1, an active 56 kilobits per second nonsubrate channel is defined and the four bits comprising data field A are transmitted to decoder 14 via path 17 as the control word for that channel. When B≠00, C=1 and c=1, an active subrate channel is defined and the four bits comprising data field a are transmitted as the control word.

Figure 7:
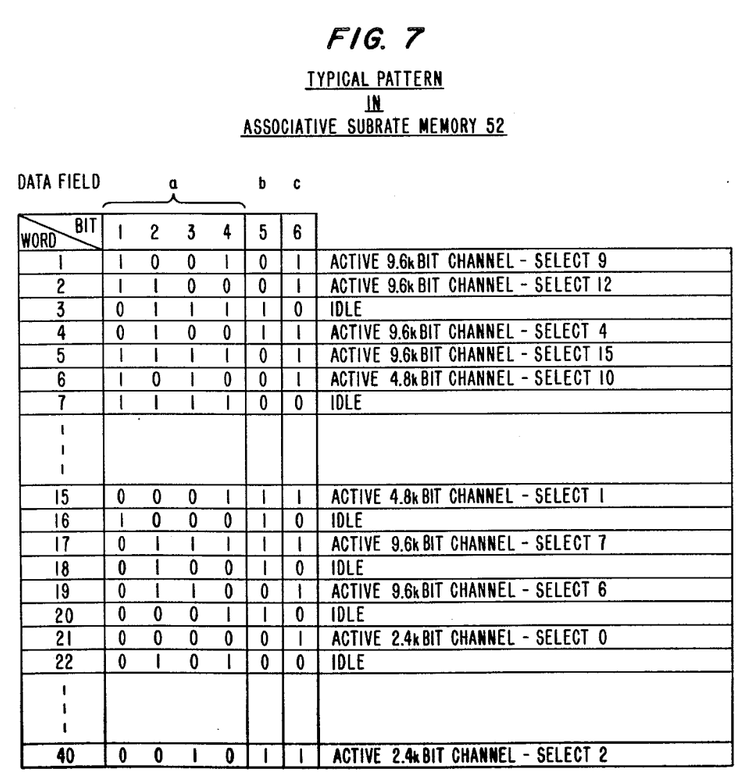

An operation of control word source 50 is initiated at the beginning of a super frame when a timing circuit (not shown) in synchronism with time-multiplexed line 11 transmits a RESET pulse on line 17 to time-slot counter 53 and location generator 60. By repetitively reading from locations of memory 51 defined by counter 53 and from locations of memory 52 defined by location generator 60, a 2560-word sequence is generated and transmitted to control switching network 12 during each super frame. The generation of these sequences can be better understood by considering the following example having four of the 128 channels per frame on line 11 used as active subrate channels and the remaining 124 channels either being idle or active 56 kilobits per second nonsubrate channels. Channels 9 and 26 are 9.6 kilobits per second channels shared by four stations and two stations, respectively. Channel 12 is a 4.8 kilobits per second channel shared by two stations and channel 17 is a 2.4 kilobits per second channel shared by two stations. Typical patterns in memory 51 and memory 52 for this example are shown in FIGS. 6 and 7, respectively. Memory 51 stores 128 words corresponding to the 128 channels per frame (FIG. 6). The word in location 1 of memory 51, for example, defines channel 1 as an active 56 kilobits per second nonsubrate channel and data field A contains the control word 0101 defining the path from incoming line 11 to outgoing line 13-5 for channel 1. The word in location 9 of memory 51 defines channel 9 as a 9.6 kilobits per second subrate channel and data field E indicates that the path-definition word for channel 9 of the first frame of each five-frame sequence is stored at location 1 of memory 52 (FIG. 7). Data field a of the word stored at location 1 of memory 52 contains the control word 1001 defining the path from incoming line 11 to outgoing line 13-9 for channel 9 during the first frame of each five-frame sequence. The path-definition words for channel 9 of the second through the fifth frame of each five-frame sequence are stored at consecutive locations 2 through 5 of memory 52. The word in location 12 of memory 51 (FIG. 6) defines channel 12 as a 4.8 kilobits per second subrate channel and data field E indicates that the path-definition word for channel 12 of the first frame of each ten-frame sequence is stored at location 6 of memory 52 (FIG. 7). The path-definition words for channel 12 of the second through the tenth frame of each ten-frame sequence are stored at consecutive locations 7 through 15 of memory 52. The word in location 17 of memory 51 (FIG. 6) defines channel 17 as a 2.4 kilobits per second subrate channel and data field E indicates that the path-definition word for channel 17 of the first frame of each super frame (twenty-frame sequence) is stored at location 21 of memory 52 (FIG. 7). The path-definition words for channel 17 of the second through the twentieth frame of each super frame are stored at consecutive locations 22 through 40 of memory 52. The word in location 26 of memory 51 (FIG. 6) defines channel 26 as a 9.6 kilobits per second subrate channel and data field E indicates that the path-definition word for channel 26 of the first frame of each five-frame sequence is stored at location 16 of memory 52 (FIG. 7). The path-definition words for channel 26 of the second through the fifth frame of each five-frame sequence are stored at consecutive locations 17 through 20 of memory 52.

Figure 8:
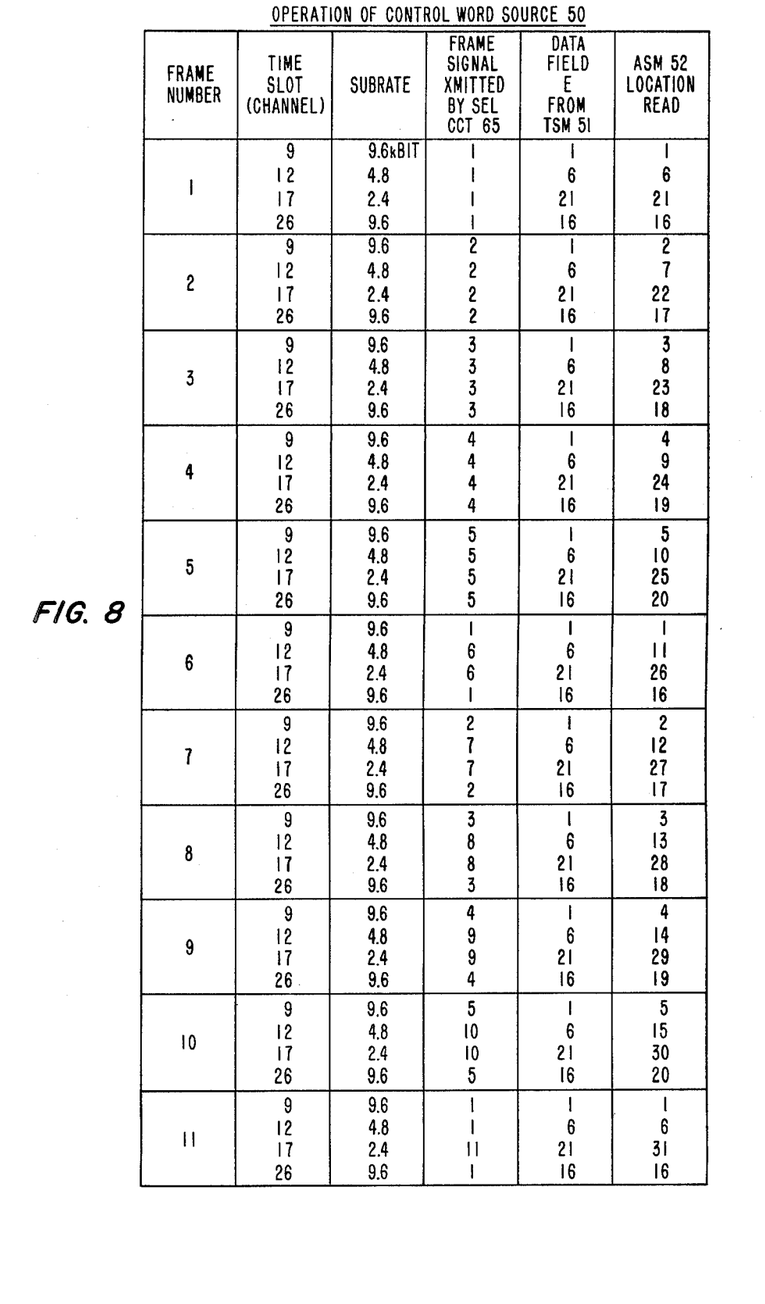
FIG. 8 illustrates the operational sequence of the control word source of FIG. 1.

The operation of control word source 50 for channels 9, 12, 17 and 26 of the first eleven frames of a super frame is summarized in FIG. 8 for the present example. Note that the location of memory 52 read is given by subtracting one from the sum of the frame signal transmitted by selector circuit 65 and data field E read from memory 51. In accordance with this example, the required 2560-word control sequence is achieved by a control word source having only 128 storage locations in memory 51 and 40 storage locations in memory 52. This is to be contrasted with the 2560 storage locations that would be required in the straightforward implementations of the prior art.

It is to be understood that the above-described embodiment is merely illustrative of the principles of the invention and that other embodiments may be devised by those skilled in the art without departing from the spirit and scope of the invention. For example, although control word source 50 is used to control the space path through network 12 in the system described, by adding an additional data field to the words stored in memory 51 and memory 52 source 50 could also control the time path achieved by reading words from a time-slot interchanger at locations defined by the additional data field.

Further, any data rate obtained by dividing 48 kilobits per second by an integer, r, can be accommodated by adding additional bits to field B of the words stored in time-slot memory 51 and modifying control word source 50 to include a modulo-r counter and adding r storage locations for each such anticipated channel to associative subrate memory 52. It should also be noted that a given time division switching system may include a plurality of control word sources similar to source 50 in the system described herein.

What is claimed is:

1. A control word source for supplying control words defining nonsubrate and subrate data communication paths through a time division switching system comprising subrate memory means having a plurality of locations for storing subrate data path-definition words, nonsubrate and reference memory means for storing nonsubrate data path-definition words and storage reference words, circuit means responsive to storage reference words read from said nonsubrate and reference memory means for defining said subrate memory means locations to effect a reading of said subrate data path-definition words and logic means responsive to nonsubrate data path-definition words read from said nonsubrate and reference memory means for supplying control words defining nonsubrate data communication paths through said time division switching system and responsive to subrate data path-definition words read from said subrate memory means locations for supplying control words defining subrate data communication paths through said time division switching system.

2. A control word source of claim 1 wherein said circuit means comprises means for generating timing pulses and location generator means responsive to a receipt of said timing pulses and said read storage reference words for generating location signals defining said subrate memory means locations.

3. A control word source of claim 2 wherein said location generator means comprises frame signal generator means responsive to said timing pulses for generating frame signals and apparatus responsive to the frame signals generated by said frame signal generator means and said read storage reference words for generating said location signals.

4. A control word source of claim 3 wherein said frame signal generator means comprises frequency divider means responsive to said timing pulses for generating frame pulses at a rate of one frame pulse per fixed number of said timing pulses and counter means responsive to the frame pulses generated by said frequency divider means for generating said frame signals by counting said generated frame pulses.

5. A control word source of claim 4 wherein said apparatus comprises means responsive to said generated frame signals and said read storage reference words for generating each of said location signals by arithmetically combining a portion of one of said read storage reference words with one of said generated frame signals.

6. A control word source of claim 4 wherein said counter means comprises
a plurality of modulo counters each responsive to said generated frame pulses for generating a unique repeating sequence of frame signals.

7. A control word source of claim 6 wherein said apparatus comprises
selector means responsive to each one of said read storage reference words for selecting the one of said plurality of modulo counters defined by said each one of said read storage reference words and
means responsive to said each one of said read storage reference words for generating one of said location signals by arithmetically combining a portion of said each one of said read storage reference words with one frame signal of the unique repeating sequence of frame signals generated by said selected one of said plurality of modulo counters.

8. In a time division switching system comprising
clock means for generating timing pulses,
a control word source responsive to said timing pulses for transmitting control words,
a decoder for decoding said control words to generate enable signals, and
switching means responsive to said enable signals for establishing communication paths, the invention wherein said control word source comprises
first storage means comprising storage locations for storing a first plurality of path-definition words defining communication paths through said switching means for nonsubrate data channels and a plurality of storage reference words for subrate data channels,
second storage means comprising storage locations for storing a second plurality of path-definition words defining communication paths through said switching means for subrate data channels,
means for sequentially effecting a reading of said first storage means locations,
location generator means responsive to a receipt of said timing pulses and a plurality of read storage reference words for generating location signals defining ones of said second storage means locations,
means responsive to the location signals generated by said location generator means for effecting a reading of said defined ones of said second storage means locations, and
logic means responsive to each of a plurality of path-definition words read from said first storage means locations and each of a plurality of path-definition words read from said second storage means locations for supplying to said decoder ones of said control words for said nonsubrate and subrate data channels.

9. The invention of claim 8 wherein said location generator means comprises
frame signal generator means responsive to said timing pulses for generating frame signals and
apparatus responsive to the frame signals generated by said frame signal generator means and said plurality of read storage reference words for generating said location signals.

10. The invention of claim 9 wherein said frame signal generator means comprises
frequency divider means responsive to said timing pulses for generating frame pulses at a rate of one frame pulse per fixed number of said timing pulses and
counter means responsive to the frame pulses generated by said frequency divider means for generating said frame signals by counting said generated frame pulses.

11. The invention of claim 10 wherein said apparatus comprises
means responsive to said generated frame signals and said plurality of read storage reference words for generating each of said location signals by arithmetically combining a portion of one of said plurality of read storage reference words with one of said generated frame signals.

12. The invention of claim 10 wherein said counter means comprises
a plurality of modulo counters each responsive to said generated frame pulses for generating a unique repeating sequence of frame signals.

13. The invention of claim 12 wherein said apparatus comprises
selector means responsive to each one of said read storage reference words for selecting the one of said plurality of modulo counters defined by said each one of said read storage reference words and
means responsive to said each one of said read storage reference words for generating one of said location signals by arithmetically combining a portion of said each one of said read storage reference words with one frame signal of the unique repeating sequence of frame signals generated by said selected one of said plurality of modulo counters.

14. The invention of claims 11 or 13 wherein said time division switching system further comprises
central processor means responsive to calls for writing path-definition words into said first and second storage means locations defining new communication paths through said switching means for said nonsubrate and subrate data channels.

15. A method of generating control words for controlling the establishment of communication paths in a time division switching system, said method comprising
sequentially reading a first plurality of path-definition words and a plurality of storage reference from a first memory,
deriving control words from said first plurality of read path-definition words,
for each one of said plurality of read storage reference words, reading one of a second plurality of path-definition words from a second memory at a location defined by said each one of said plurality of read storage reference words and deriving a control word from said read one of said second plurality of path-definition words.

16. A method of generating control words for controlling the establishment of communication paths in a time division switching system operative in frames of time slots, said method comprising
sequentially reading a first plurality of path-definition words and a plurality of storage reference words from a first memory during each of said frames,
deriving control words from said first plurality or read path-definition words,
generating a repeating sequence of frame signals at a rate of one frame signal during each of said frames, and
for each one of said plurality of storage reference words read during a given frame, reading one of a second plurality of path-definition words from a second memory at a location defined by said each one of said plurality of read storage reference words and by the one of said frame signals generated during said given frame and deriving a control word from said read one of said second plurality of path-definition words.

17. A method of generating control words for controlling the establishment of communication paths in a time division switching system operative in frames of time slots, said method comprising sequentially reading a first plurality of path-definition words and a plurality of storage reference words from a first memory during each of said frames, deriving control words from said first plurality of read path-definition words, generating a plurality of unique repeating sequences of frame signals each at a rate of one frame signal during each of said frames, and for each one of said plurality of storage reference words read during a given frame, reading one of a second plurality of path-definition words from a second memory at a location defined by said each one of said plurality of read storage reference words and by the frame signal generated during said given frame of the one of said plurality of unique repeating sequences defined by said each one of said plurality of read storage reference words and deriving a control word from said read one of said second plurality of path-definition words.

* * * * *